United States Patent
Shestak et al.

(10) Patent No.: US 9,170,328 B2
(45) Date of Patent: Oct. 27, 2015

(54) SYSTEMS AND METHODS FOR IMPROVING BEARING AVAILABILITY AND ACCURACY

(71) Applicant: Honeywell International Inc., Morristown, NJ (US)

(72) Inventors: Eduard Shestak, Redmond, WA (US); Ruy C. Brandao, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 321 days.

(21) Appl. No.: 13/661,065

(22) Filed: Oct. 26, 2012

(65) Prior Publication Data

US 2014/0118192 A1  May 1, 2014

(51) Int. Cl.
*G01S 13/93* (2006.01)
*G01S 3/48* (2006.01)

(52) U.S. Cl.
CPC ............ *G01S 13/9303* (2013.01); *G01S 3/48* (2013.01)

(58) Field of Classification Search
USPC ............ 342/30, 417, 442, 445; 701/521, 522
See application file for complete search history.

(56) References Cited

U.S. PATENT DOCUMENTS

| | | | |
|---|---|---|---|
| 4,855,748 A | 8/1989 | Brandao et al. | |
| 5,235,336 A | 8/1993 | Sturm et al. | |
| 5,552,788 A | 9/1996 | Ryan et al. | |
| 5,677,693 A | 10/1997 | Frankot et al. | |
| 6,169,519 B1 | 1/2001 | Holecek et al. | |
| 6,223,123 B1 | 4/2001 | Ryan et al. | |
| 7,583,223 B2 | 9/2009 | Brandao et al. | |
| 2005/0156777 A1 | 7/2005 | King et al. | |
| 2008/0068250 A1 | 3/2008 | Brandao et al. | |
| 2008/0120032 A1 | 5/2008 | Brandao et al. | |
| 2008/0204310 A1 | 8/2008 | Blessing et al. | |
| 2008/0284637 A1 | 11/2008 | Blessing et al. | |
| 2010/0117886 A1 | 5/2010 | Brandao et al. | |
| 2011/0267216 A1 | 11/2011 | Smith | |

FOREIGN PATENT DOCUMENTS

EP     1901087 A1    3/2008

OTHER PUBLICATIONS

U.S. Appl. No. 13/661,029, by Zeng et al., filed Oct. 25, 2012.
U.S. Appl. No. 13/661,064, by Brandao, Sr. et al., filed Oct. 26, 2012.
Response to Examination Report dated Feb. 20, 2014, from counterpart European Application No. 13186968.7, dated Jun. 23, 2014, 13 pp.
Search Report from counterpart EPC Patent Application No. 13186968.7, dated Feb. 7, 2014, 3 pp.
Examination Report from counterpart EPC Patent Application No. 13186968.7, dated Feb. 20, 2014, 5 pp.

*Primary Examiner* — Dao Phan
(74) *Attorney, Agent, or Firm* — Shumaker & Sieffert, P.A.

(57) ABSTRACT

Systems and methods for improving bearing initialization for a pair of two-element antennas. An exemplary system includes two-element antennas mounted on the bottom and top of an aircraft fuselage, an output device, and a processing device. The processing device receives phase-difference information based on phase of signals received at each element of a two-element antenna, determines if the received phase-difference information is within a predefined low-confidence region, and initializes bearing if the phase-difference information is not within the low-confidence region or the phase-difference information from a predefined number of consecutively received signals meets a predefined consistency requirement.

15 Claims, 4 Drawing Sheets

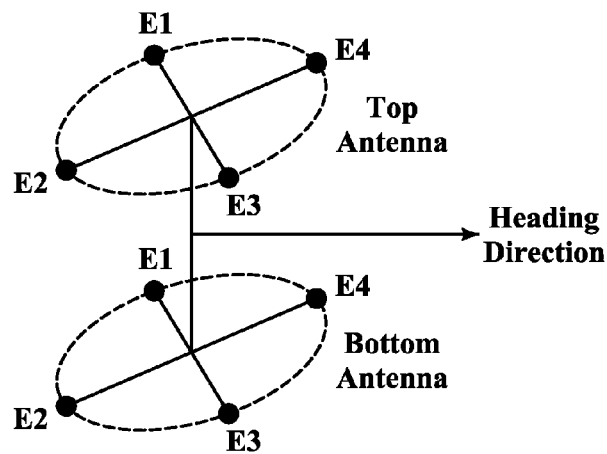
FIG. 1 *(Prior Art)*
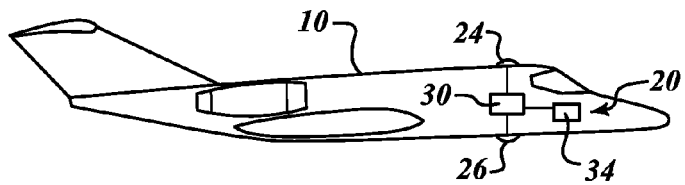
FIG. 2-1
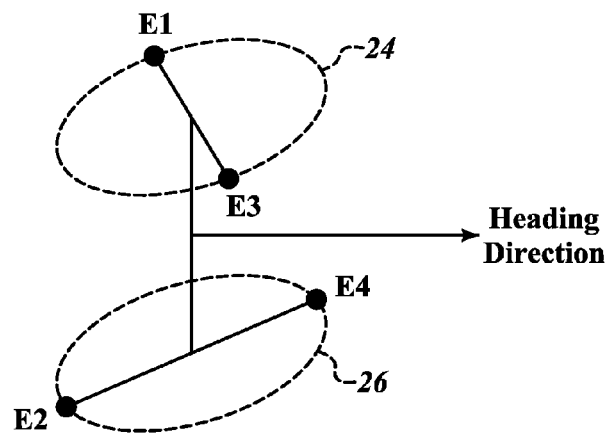
FIG. 2-2

SYSTEMS AND METHODS FOR IMPROVING BEARING AVAILABILITY AND ACCURACY

BACKGROUND OF THE INVENTION

Traffic collision-avoidance systems (TCAS) use two antennas, one on the top and one on the bottom of an aircraft, each of which is used to estimate the relative bearing between one's own aircraft and an intruder. Each traditional TCAS antenna has four elements, which are placed orthogonally on the same plane, as shown in FIG. 1. A TCAS system interrogates the transponder on the other aircraft. The transponders of other aircraft respond with a reply that may contain altitude or other information. The TCAS uses the reply signal and its multi-element directional antenna to estimate the relative bearing of the other aircraft. In some systems, the phase difference of the reply signal received at elements E1 and E3 is proportional to the sine function value of the intruder's bearing angle, and the phase difference between elements E2 and E4 is proportional to the cosine function value of the intruder's bearing angle (where the E1/E3 pair and the E2/E4 pair are orthogonal). The system can estimate the bearing from the signals received on one multi-element antenna. Although this is an adequate setup for determining bearing, it is redundant, costly, and comes with a weight penalty because of the two antennas and eight antenna elements that are needed.

A bearing calculated from a single reply, squitter, or their combination, might be corrupted at the point of reception by interference (multipath, reflection from airframe or nearby obstacles). Even under stationary settings, such corrupted raw bearings vary to the extent that, on display (if not heavily filtered), it looks like a moving target. However, such movements do not look natural and may decrease confidence in the system.

SUMMARY OF THE INVENTION

The present invention provides systems and methods for improving bearing initialization for a pair of two-element antennas. An exemplary system includes two-element antennas mounted on the bottom and top of an aircraft fuselage, an output device, and a processing device. The processing device receives phase-difference information based on the phase of signals received at each element of a first of the two-element antennas, determines if the received phase-difference information is within a predefined low-confidence region, and initializes bearing if the phase-difference information is not within the low-confidence region or the phase-difference information from a predefined number of consecutively received signals meets a predefined consistency requirement.

The algorithm evaluates the phase from the low-confidence region and it also estimates bearings using the phase from this low-confidence region and evaluates the stability of these bearings as well. When it initializes bearing it requires phase measurements from all four elements—two on the top and two on the bottom.

BRIEF DESCRIPTION OF THE DRAWINGS

Preferred and alternative embodiments of the present invention are described in detail below, with reference to the following drawings:

FIG. 1 illustrates a prior-art antenna setup for a vehicle;

FIG. 2-1 is a schematic diagram of an aircraft having a system formed in accordance with an embodiment of the present invention;

FIG. 2-2 illustrates an antenna setup for the aircraft shown in FIG. 2-1.

DETAILED DESCRIPTION OF THE INVENTION

Figure 3:
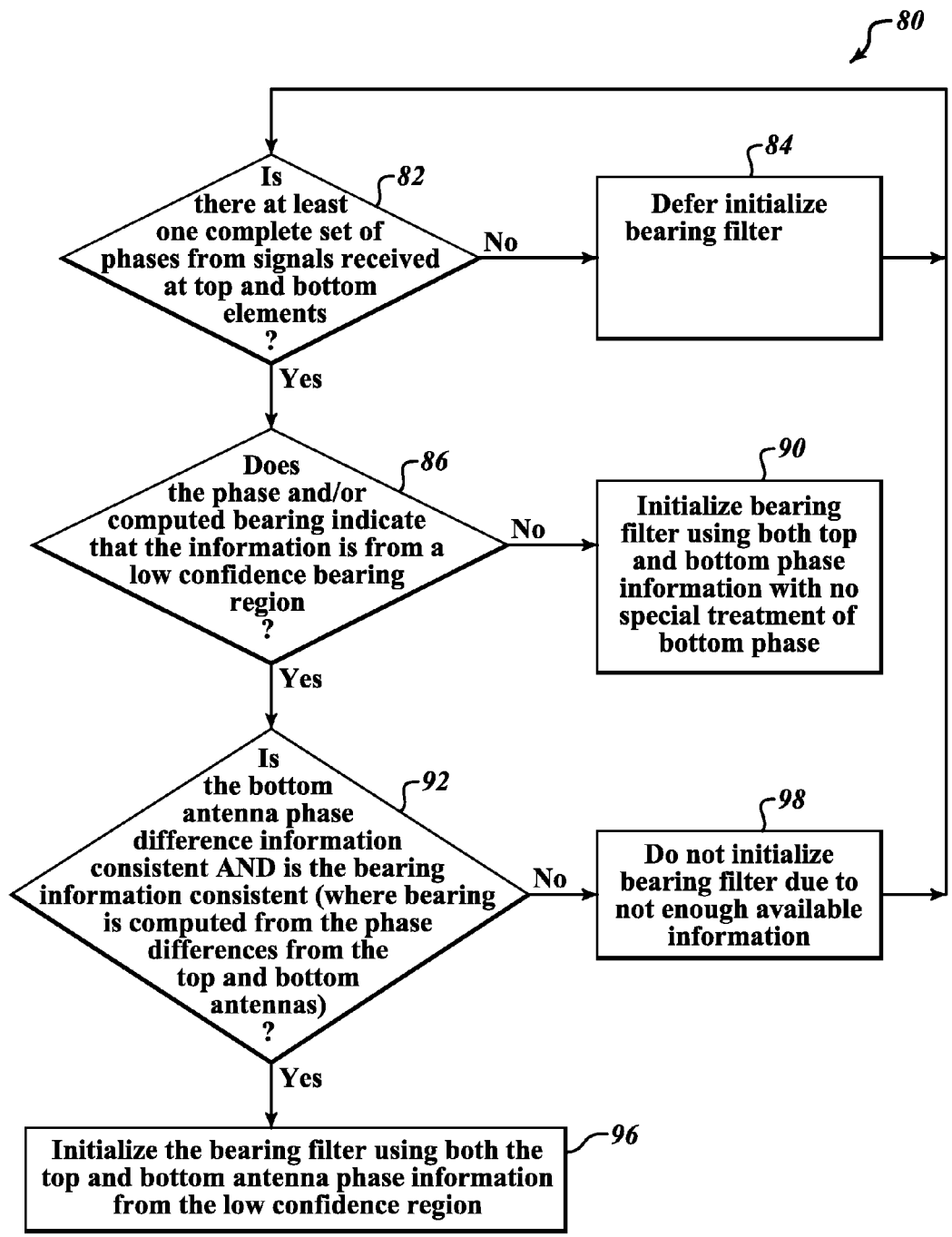
FIG. 3 is a flow diagram of an exemplary process performed by the system shown in FIG. 2-1.

FIG. 2-1 illustrates an exemplary aircraft 10 having a traffic collision-avoidance system (TCAS) 20 formed in accordance with an embodiment of the present invention. The TCAS 20 includes a first two-element antenna 24 located on the top of the aircraft 10, a second two-element antenna 26 on the bottom of the aircraft 10, and a TCAS processor 30 that is in signal communication with the antennas 24, 26. The processor 30 performs bearing estimation, based on signals received from the antennas 24, 26. The estimated bearing value is sent to another device for output, such as a display device 34.

As shown in FIG. 2-2, a first axis that links the two elements E1, E3 of the first antenna 24 may be orthogonal to a second axis that links the two elements E2, E4 of the second antenna 26. The vertical axis doesn't necessarily run through the aircraft's center of gravity.

FIG. 3 illustrates a flowchart of an exemplary process 80 performed by the system shown in FIG. 2-1. At a decision block 82, the processor 30 determines if at least one complete set of phases has been received from signals at the top and bottom antenna elements. If a complete set has not been received (from the same time), then, at a block 84, bearing initialization is deferred until a complete set has been received. If a complete set has been received, then, at a decision block 86, the processor 30 determines if the phase and/or computed bearing (based on the phase) indicate that the signal (information) is from a low-confidence bearing region. If the phase and/or computed bearing do not indicate the signal is from the low-confidence bearing region, then, at a block 90, the bearing filter is initialized, using both top and bottom antennas' phase information. If the phase and/or computed bearing do indicate the signal is from the low-confidence bearing region, then, at a decision block 92, the processor determines if phase-difference information of the bottom antenna is consistent and if the bearing information is consistent. The bearing information is computed from the phase differences from the top and bottom antennas. If the conditions in decision block 92 are not true, then, at a block 98, bearing filter initialization does not occur because the phase and bearing information is not adequate. If the conditions in decision block 92 are true, then, at a block 96, bearing-filter initialization occurs using the phase information from the top and bottom antennas.

There are other methods for determining consistency, including but not limited to the following methods:

checking the variation between a group of phase and bearing measurements;

checking the rate of change of a set of phase and bearing estimates; and checking the variation about the mode, mean, or median about a group of consecutive phase and bearing estimates.

Any of the above checking techniques may be used with the low-confidence region method.

To Initialize Bearing—there must be at least one bearing with both the top phase measurement and bottom phase measurement. However, while on the ground (or with landing gear extended), the phase measurements from the bottom, when combined with phase measurements from the top antenna, can result in inaccurate bearing—especially in some low-confidence regions. The present invention allows initialization of bearing even when the phase measurements are coming from the bottom antenna in a region where the system cannot rely on one measurement/estimate (low-confidence regions). In these regions—in order to initialize or determine bearing, multiple top/bottom phase measurements are required. If the bottom phase measurements are consistent and the resulting bearing estimates (using the top and bottom phase measurements) are consistent, then the bearing can be initialized (through standard filtering or averaging techniques).

Figure 4:
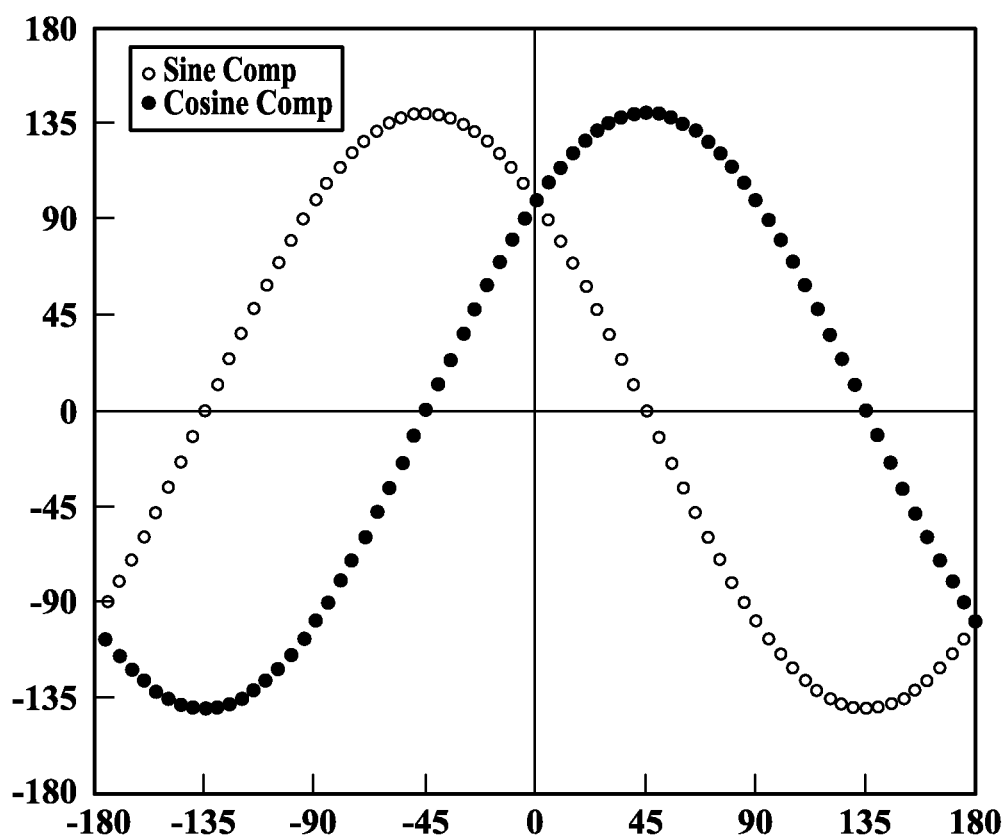
FIG. 4 is a graph of phase/bearing signals associated with the antennas shown in FIG. 2-2.

As shown in FIG. 4, SineComp and CosineComp represent the same data, but for two antennas positioned differently (i.e., top and bottom antennas 24, 26). The SineComp is for a two-element antenna with dipoles at −45 and 135 degrees (bearing/azimuth-wise relative to the vehicle (i.e., the aircraft 10) in which it is mounted). The CosineComp is for a two-element antenna with dipoles at 45 and −135 degrees. Minimum and maximum values of these signals depend on electric phase spacing of the antenna elements.

Phase difference vs. bearing graph and chart (FIGS. 4 and 5, respectively) indicate that the phase-difference response of the two-element antenna 24 (26) is not linear and not the same around a 360° circle. At regions where the bearing aligns with the antenna elements, the slope of the phase-difference magnitude is smaller. In these regions, the phase difference changes less with bearing. These regions are considered "dull" regions. At regions whose bearing is not aligned with the antenna elements, phase slope is larger or "sharper" (and almost linear with bearing) with maximum slope sharpness at directions that are 90° to a line connecting antenna elements. The sharp region centers are located at −135 and 45 degree bearing for the SineComp and at −45 and 135 degrees for the CosineComp. Therefore bearing accuracy in the "dull" regions is more sensitive to errors in phase, because a small change in phase results in a large change in bearing.

Interference complicates the bearing-filter initialization, especially in the dull regions 110, 112. In actual application, the interference differently impacts top and bottom antennas, with the bottom antenna being impacted to a greater degree. The following explanation is for a case in which the bottom antenna 26 is the SineComp antenna. However, a case in which the bottom antenna is the CosineComp antenna is approached in the same way.

Figure 5:
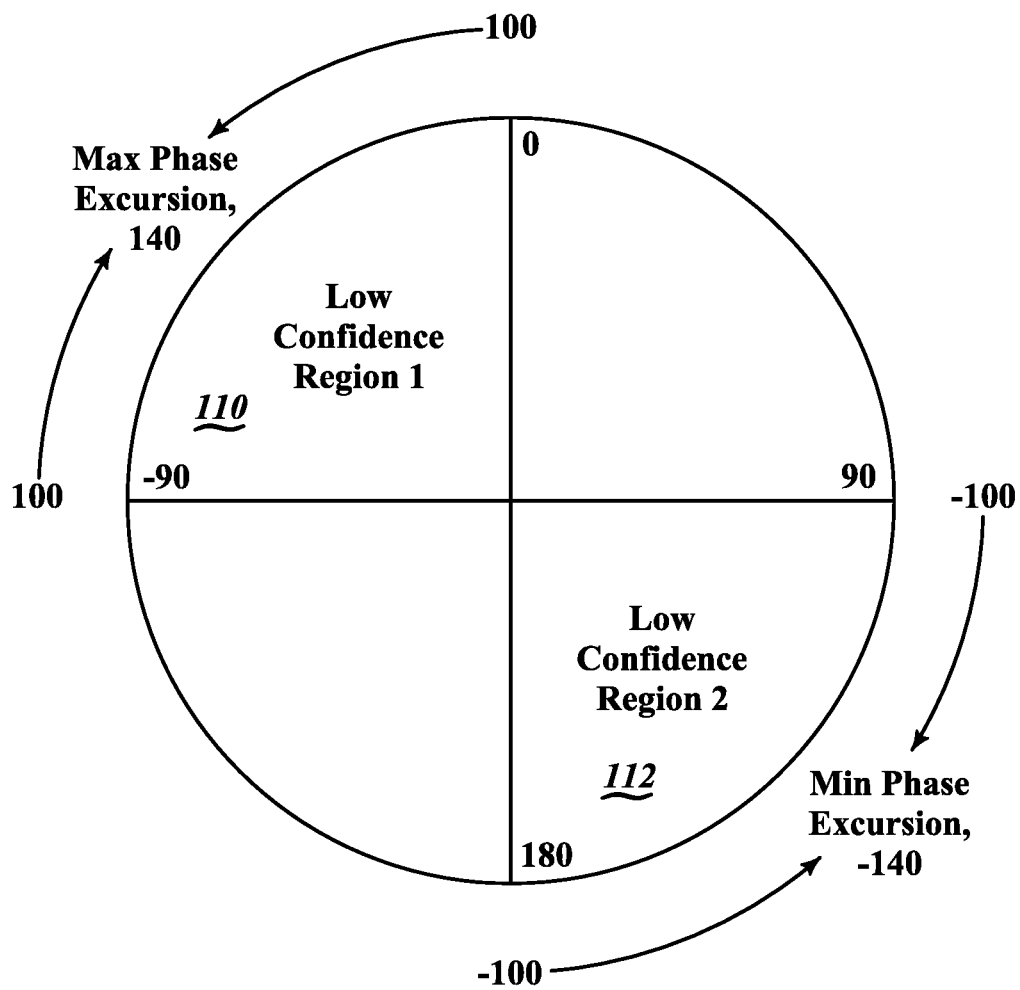
FIG. 5 is a chart that shows low-confidence regions for one of the antennas of the system in FIGS. 2-1, 2-2.

Low-confidence regions 110, 112 for a SineComp antenna chart, FIG. 5, are shown in a divided 360° circle. The maximum phase excursion is not required to be 140 degrees. Phase excursion depends on electrical antenna-element distance and can be anywhere between 0 and 180 degrees. For purposes of this explanation, the antenna with a 140 degree maximum excursion is selected.

The low-confidence regions for a SineComp signal are centered about the "dull" regions. Two low-confidence regions 110, 112 are shown. One region is bounded by a bearing of −90 to 0 degrees with a corresponding phase difference of 100 to 140 degrees. The other region is bounded by a bearing of 90 to 180 degrees and a phase difference of −140 to −100 degrees. Other factors can be used to determine the extent of the low confidence regions (e.g., aircraft location and empirical data collection on aircraft).

Although the low-confidence region can be statically set for all aircraft or a certain aircraft type—it can also be determined dynamically by the system and stored in a table and adjusted over time. In one embodiment, a default low-confidence region is defined and then the system changes the default to be more customized for the own aircraft. For example, "truth bearing" derived from own ship latitude and longitude and heading together with the intruder's ADS-B/ADS-R/TIS-B reported latitude and longitude can be used to refine the location and extent of the low confidence region. Alternatively, the low confidence region could be defined as part of an installation procedure using test equipment.

Under ideal conditions (no interference), in the low-confidence region 110, bearing (clockwise) is between −90 and 0 degrees (zero being aircraft nose), while its corresponding SineComp antenna-phase difference is between 100 and 140 degrees. For the low-confidence region 112, bearing (clockwise) is between 90 and 180 degrees, while its corresponding SineComp antenna-phase difference is between −100 and −140 degrees. If a raw bearing (calculated from received phase information (a reply or squitter signal)) is within the low-confidence region 110 or 112 and the corresponding phase difference is within a phase-difference range for the same region, then the raw bearing is considered as a high-confidence raw bearing.

In the low-confidence region—the phase has certain limits and so does the bearing. The phase and/or bearing are examined.

The bearing filter is initialized when a consistent sequence of high-confidence raw bearings from low confidence region (or bearings from high confidence region) is received. The sequence is consistent when all bearings are within the same low-confidence region 110 or 112. The sequence length is bounded on the low end by the possibility of incorrect filter initialization and on the high end by the total time required to collect the needed number of signals for initialization. Allowed misses may be used during bearing filter initialization. The miss is a case in which a reply or squitter is received but raw bearing or phase difference information is not available.

Bearing initialization occurs when the sequence of raw bearings is outside of the low-confidence regions 110 or 112. This is because confidence is high that the raw bearing is accurate, for the reasons described above.

Once the bearing filter is initialized, it is used to smooth raw bearings and to predict target bearing. Under the interference condition, when the bottom antenna-phase difference is distorted, the bottom antenna-phase difference or raw bearing is not used for bearing tracking. Instead, filter prediction and phase difference from the top antenna 24 are used without any information from the lower antenna 26.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   at a processing device,
   a) receiving phase-difference information based on phase of signals received at each element of a first two-element antenna;
   b) receiving phase-difference information based on phase of signals received at each element of a second two-element antenna;
   c) determining if the received phase-difference information associated with the first antenna is from within a predefined low-confidence region; and d) initializing bearing based on the received phase-difference information, if the phase-difference information is not from within the low-confidence region or the phase-difference information from a predefined number of consecutively received signals meets a predefined consistency requirement with regard to the low-confidence region.

2. The method of claim 1, wherein the consistency requirement comprises the phase-difference information being located in the same low-confidence region for a predefined number of signals in a sequence of the received signals.

3. The method of claim 1, wherein the first two-element antenna comprises an antenna mounted on a bottom of an aircraft's fuselage and the second two-element antenna is mounted on the top of the aircraft's fuselage.

4. The method of claim 1, further comprising:
at the processor device,
determining if there is more than a threshold amount of complete sets of phase-difference information received from the first and second two-element antennas; and
deferring d) if the threshold amount of complete sets of phase-difference information has not been received.

5. The method of claim 1, further comprising:
at the processor device,
computing bearing information based on phase-difference information from the first and second two-element antennas,
wherein initializing bearing comprises initializing bearing when at least one of the phase-difference information associated with the first antenna is from within the predefined low-confidence region or the computed bearing information is from within the predefined low-confidence region and the phase-difference information from a predefined number of consecutively received signals meets a predefined consistency requirement and the computed bearing information meets a second predefined consistency requirement.

6. A system comprising:
a means for receiving phase-difference information based on phase of signals received at each element of a first two-element antenna;
a means for receiving phase-difference information based on phase of signals received at each element of a second two-element antenna;
a means for determining if the received phase-difference information associated with the first antenna is from within a predefined low-confidence region; and
a means for initializing bearing based on the received phase-difference information, if the phase-difference information is not from within the low-confidence region or the phase-difference information from a predefined number of consecutively received signals meets a predefined consistency requirement with regard to the low-confidence region.

7. The system of claim 6, wherein the consistency requirement comprises the phase-difference information being located in the same low-confidence region for a predefined number of signals in a sequence of the received signals.

8. The system of claim 6, wherein the first two-element antenna comprises an antenna mounted on a bottom of an aircraft's fuselage and the second two-element antenna is mounted on the top of the aircraft's fuselage.

9. The system of claim 6, further comprising:
a means for determining if there is more than a threshold amount of complete sets of phase-difference information received from the first and second two-element antennas; and
a means for deferring the means for initializing bearing, if the threshold amount of complete sets of phase-difference information has not been received.

10. The system of claim 6, further comprising:
a means for computing bearing information based on phase-difference information from the first and second two-element antennas,
wherein the means for initializing bearing initializes bearing when at least one of the phase-difference information associated with the first antenna is from within the predefined low-confidence region or the computed bearing information is from within the predefined low-confidence region and the phase-difference information from a predefined number of consecutively received signals meets a predefined consistency requirement and the computed bearing information meets a second predefined consistency requirement.

11. A system comprising:
a first two-element antenna configured to receive standard transponder signals;
a second two-element antenna configured to receive standard transponder signals;
an output device; and
a processing device configured to:
receive phase-difference information based on phase of the signals received at each element of the first two-element antenna;
receive phase-difference information based on phase of the signals received at each element of the second two-element antenna;
determine if the received phase-difference information associated with the first antenna is from within a predefined low-confidence region; and
initialize bearing based on the received phase-difference information, if the phase difference information is not from within the low-confidence region or the phase-difference information from a predefined number of consecutively received signals meets a predefined consistency requirement with regard to the low-confidence region.

12. The system of claim 11, wherein the first two-element antenna comprises an antenna mounted on a bottom of an aircraft and the second two-element antenna comprises an antenna mounted on a top of the aircraft.

13. The system of claim 11, wherein the consistency requirement comprises the phase-difference information being located in the same low-confidence region for a predefined number of signals in a sequence of the received signals.

14. The system of claim 11, wherein the processor device is further configured to:
determine if there is more than a threshold amount of complete sets of phase-difference information received from the first and second two-element antennas; and
defer bearing initialization, if the threshold amount of complete sets of phase-difference information has not been received.

15. The system of claim 11, wherein the processor device is further configured to:
compute bearing information based on phase-difference information from the first and second two-element antennas, wherein bearing is further initialized when at least one of the phase-difference information associated with the first antenna is from within the predefined low-confidence region or the computed bearing information is from within the predefined low-confidence region and the phase-difference information from a predefined number of consecutively received signals meets a predefined consistency requirement and the computed bearing information meets a second predefined consistency requirement.

* * * * *